United States Patent
Gopal et al.

(10) Patent No.: US 7,797,612 B2
(45) Date of Patent: Sep. 14, 2010

(54) STORAGE ACCELERATOR

(75) Inventors: Vinodh Gopal, Westboro, MA (US); Yogesh Bansal, Ashland, MA (US); Gilbert M. Wolrich, Framingham, MA (US); Wajdi Feghali, Boston, MA (US); Kirk Yap, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 928 days.

(21) Appl. No.: 11/617,966

(22) Filed: Dec. 29, 2006

(65) Prior Publication Data

US 2008/0162806 A1 Jul. 3, 2008

(51) Int. Cl.
*G11C 29/00* (2006.01)

(52) U.S. Cl. .................................... 714/770

(58) Field of Classification Search ............. 714/6, 714/746, 763, 770
See application file for complete search history.

(56) References Cited

U.S. PATENT DOCUMENTS

| | | | |
|---|---|---|---|
| 4,555,784 A | 11/1985 | Wood | |
| 5,105,378 A | 4/1992 | Mori | |
| 5,485,598 A * | 1/1996 | Kashima et al. | 714/6 |
| 6,041,431 A * | 3/2000 | Goldstein | 714/784 |
| 6,594,796 B1 * | 7/2003 | Chiang | 714/800 |
| 6,952,476 B1 | 10/2005 | Mao | |
| 7,194,499 B2 | 3/2007 | Jeong et al. | |
| 7,219,289 B2 * | 5/2007 | Dickson | 714/752 |
| 7,321,916 B2 | 1/2008 | Harrison et al. | |

(Continued)

FOREIGN PATENT DOCUMENTS

JP 02-259359 A 10/1990

(Continued)

OTHER PUBLICATIONS

"PCI Express Base Specification Revision 1.0a", PCI Express. Copyright 2002, 2003 PCI-SIG. Apr. 15, 2003. 428 Pages.

(Continued)

*Primary Examiner*—Shelly A Chase
(74) *Attorney, Agent, or Firm*—Grossman, Tucker, Perreault & Pfleger, PLLC

(57) ABSTRACT

The present disclosure provides a method for generating RAID syndromes. In one embodiment the method may include loading a first data byte of a first disk block and a first data byte of a second disk block from a storage device to an arithmetic logic unit. The method may further include XORing the first data byte of the first disk block and the first data byte of the second disk block to generate a first result and storing the first result in a results buffer. The method may also include iteratively repeating, loading intermediate data bytes corresponding to the first disk block and intermediate data bytes corresponding to the second disk block from the storage device to the arithmetic logic unit. The method may additionally include XORing the intermediate data bytes corresponding to the first disk block and the intermediate data bytes corresponding to the second disk block to generate intermediate results and generating a RAID syndrome based on, at least in part, the intermediate results. Of course, many alternatives, variations and modifications are possible without departing from this embodiment.

27 Claims, 8 Drawing Sheets

U.S. PATENT DOCUMENTS

| | | | |
|---|---|---|---|
| 7,343,546 B2* | 3/2008 | Edirisooriya et al. | ........ 714/770 |
| 7,437,658 B2 | 10/2008 | Kobayashi | |
| 7,467,174 B2 | 12/2008 | Wang et al. | |
| 7,660,842 B2 | 2/2010 | Ebergen et al. | |
| 7,672,990 B2 | 3/2010 | Dupaquis et al. | |
| 2003/0142818 A1 | 7/2003 | Raghunathan et al. | |
| 2005/0283714 A1 | 12/2005 | Korkishko et al. | |
| 2008/0059865 A1 | 3/2008 | Gopal et al. | |
| 2008/0069337 A1 | 3/2008 | Gopal et al. | |
| 2008/0071850 A1 | 3/2008 | Harrison et al. | |

FOREIGN PATENT DOCUMENTS

| | | |
|---|---|---|
| JP | 2000259359 | 9/2000 |
| WO | 2008/027734 A1 | 3/2008 |
| WO | 2008/027735 A1 | 3/2008 |

OTHER PUBLICATIONS

"PCI-X Addendum to the PCI Local Bus Specification", PCI Special Interest Group: Revision 1.0a. Jul. 24, 2000, 240 Pages.

"Fibre Channel—Physical and Signalling Interface-3 (FC-PH-3)", American National Standard for Information Technology. ANSI INCITS 303-1998 (R2003), 1998. 116 Pages.

"Serial ATA: High Speed Serialized AT Attachment", Revision 1.0 Aug. 29, 2001. Serial ATA Workgroup. 307 Pages.

"Information Technology—Serial Attached SCSI—1.1 (SAS-1.1)", Working Draft American National Standard. Project T10/1610-D. Revision 1, Sep. 18, 2003. 24 Pages.

Feghali, U.S. Appl. No. 11/323,994, filed Dec. 30, 2005, titled "Multiplier" (unpublished).

Feghali, U.S. Appl. No. 11/323,329, filed Dec. 30, 2005, titled "Cryptographic System Component" (unpublished).

Feghali, U.S. Appl. No. 11/323,993, filed Dec. 30, 2005, titled "Cryptography Processing Units and Multiplier" (unpublished).

Feghali, U.S. Appl. No. 11/354,404, filed Feb. 14, 2006, titled "Programmable Processing Unit" (unpublished).

"Intel XScale Core", Developer's Manual. Dec. 2000, Intel Corporation. 220 Pages.

"Announcing the Advanced Encryption Standard (AES)", Federal Information Processing Standards Publication 197, Nov. 26, 2001. 51 Pages.

"Data Encryption Standard (DES)", FIPS PUB 46-3. Oct. 25, 1999. U.S. Department of Commerce/National Institute of Standards and Technology. Category: Computer Security. Subcategory: Cryptography.

International Search Report and written opinion for PCT Patent Application No. PCT/US2007/076147, Mailed on Dec. 11, 2007. 10 Pages.

Huang, et al., "An Efficient Multiple-Precision Division Algorithm", Proceedings of the Sixth International Conference on Parallel and Distributed Computing, Applications and Technologies (PDCAT'05), IEEE. 4 Pages, 2005.

International Search Report and written opinion for PCT Patent Application No. PCT/US2007/076149, Mailed Jan. 8, 2008. 10 Pages.

Notice of Allowance received for U.S. Appl. No. 11/469,222 mailed on Jun. 4, 2009. 15 Pages.

Non-Final Office Action received for U.S. Appl. No. 11/469,243 Mailed Aug. 4, 2009. 7 Pages.

International Preliminary Report on Patentability for PCT Patent Application No. PCT/US2007/076147 mailed Mar. 12, 2009. 6 Pages.

International Preliminary Report on Patentability for PCT Patent Application No. PCT/US2007/076149 mailed Mar. 12, 2009. 6 Pages.

* cited by examiner

STORAGE ACCELERATOR

FIELD

The present disclosure describes a storage accelerator capable of processing security operations.

BACKGROUND

A Redundant Array of Inexpensive Disks (RAID) system (e.g., RAID-6) may be configured to stripe and interleave data, parity (P) and a Galois-field (GF) syndrome (hereinafter "Q syndrome" or "Q") across a plurality of storage devices (e.g., disk drives). The Q syndrome may be used to recover data sectors if two storage devices fail. To generate the Q syndrome, some RAID-6 systems utilize Galois-field calculations using a Galois-field polynomial in combination with data blocks. A Galois-field is a field with a finite number of elements. Galois-field calculations with 8-bit (Byte) fields, as applied to RAID systems, may allow for a maximum of 257 drives, 255 ($2^8-1$) of which may be data drives. The other two drives may be XOR parity (P) and the Reed-Solomon code Q. For example, given a series of stripes 0-3 (where each stripe includes 3 data disks and 2 syndrome disks), an operation may be performed on a stripe where each byte in a block (e.g., 512 bytes) may be independent from the others. The following equations define P and Q for a RAID-6 array with n data disks and 2 check disks (P may be plain parity across the stripe).

$$P = D_0 \oplus D_1 \oplus D_2 \ldots D_{n-1} \quad \text{EQ. 1)}$$

$$Q = g^0 * D_0 \oplus g^1 * D_1 \oplus g^2 * D_2 \ldots \oplus g^{n-1} * D_{n-1}; \quad \text{EQ. 2)}$$

where D represents a data byte from a respective storage device of a RAID system and generator (g) may be defined as an element of the field that can generate all elements of the field including successive powers: $g^i$. The inverse of a generator for Galois-field ($2^8$) can be computed using the following equation:

$$g^{-a} = g^{255-a} \quad \text{EQ. 3)}$$

Some of the more popular techniques for disk recovery may require a general computation of the form ($c0*D_0 \oplus c1*D_1 \oplus c2*D_2 \oplus c3*D_3$). Each coefficient ci may be a polynomial of arbitrary length (e.g. 8 bits). The multiplication operations involved in this computation may require an excessive amount of time to process.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Figure 1:
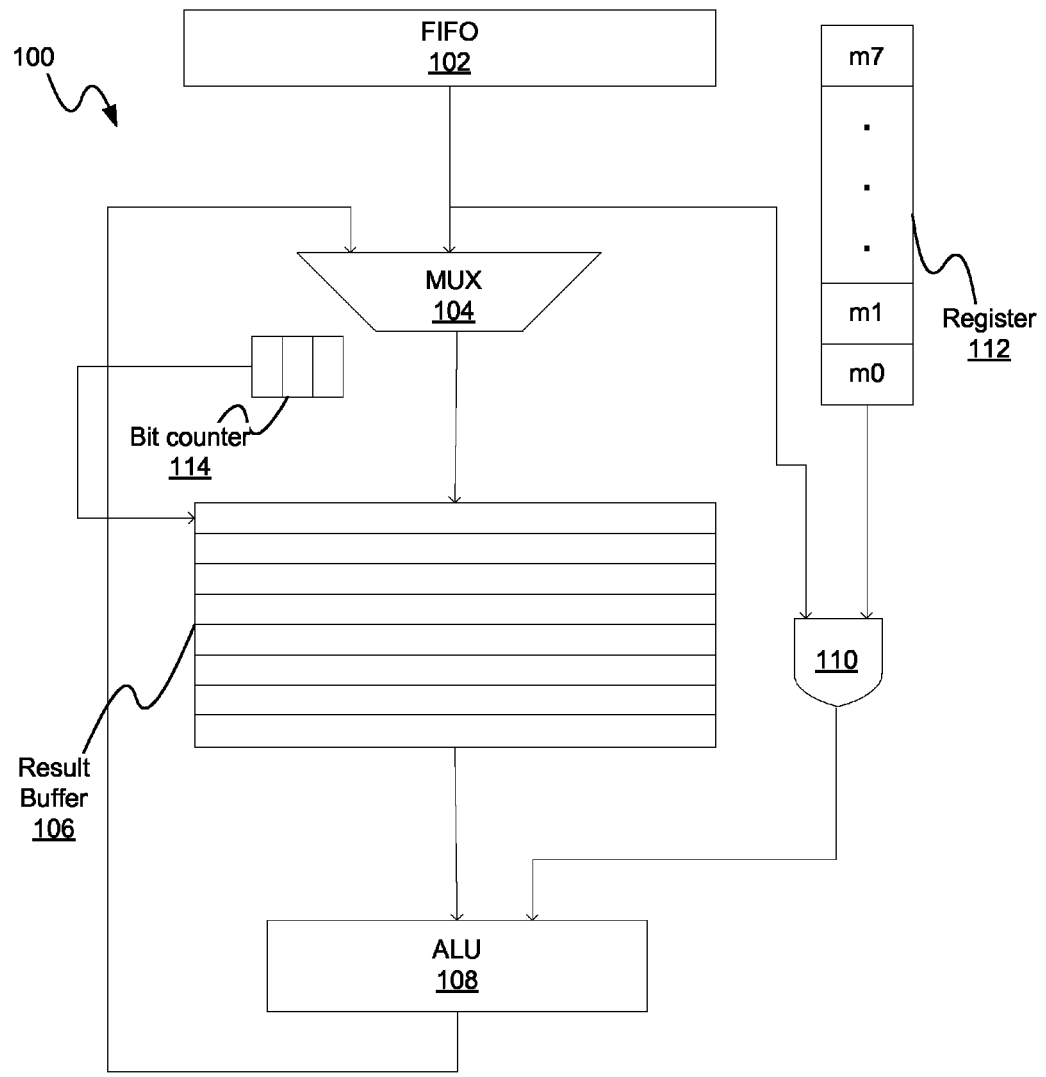
FIG. 1 is a diagram showing one exemplary embodiment of circuitry in accordance with the present disclosure.

Generally, this disclosure describes circuitry and methodology for generating P and Q, in addition to other RAID-related calculations. FIG. 1 depicts circuitry 100 in accordance with one exemplary embodiment of the present disclosure. Circuitry 100 may be configured to perform Galois-field operations to generate P and Q on any Galois-field polynomial, including, for example, standardized Galois-field polynomials such as the 11 D and 14D polynomials. In general, a Q syndrome may be generated using data bytes across one or more stripes of a plurality of storage devices in a RAID system and a Galois-field polynomial. In some embodiments, circuitry 100 may be configured to perform operations in parallel using the appropriate bytes from each disk block (e.g., circuitry 100 may be capable of operating upon 8 Bytes concurrently in a 64-bit datapath). Some embodiments may include an efficient multiplication technique capable of performing a complex disk recovery using a minimal amount of multiplications per stripe.

Circuitry 100 may include an input First-In, First-Out (FIFO) 102, which may be configured to load portions of disk blocks $D_0, D_1, D_2 \ldots D_n$ through a multiplexer (MUX) 104 and into results buffer 106. Input FIFO 102 may load data into results buffer 106 and AND circuitry 110. In some embodiments more than one input FIFO may be included. For example, one input FIFO may be configured to deliver data to MUX 104 while another FIFO may deliver data to AND circuitry 110. Multiplexer 104 may also be configured to receive an output from arithmetic logic unit (ALU) 108 and to provide a number of inputs to results buffer 106. The disk blocks (e.g., $D_0, D_1, D_2 \ldots D_n$) may be stored in a shared RAM (not shown) or other memory device prior to being loaded into input FIFO 102. Each disk block D may include a number of bytes, such as 256. In some embodiments, input FIFO 102 may be configured to store a number of different entries of various lengths (e.g., 64 bits).

In operation, results buffer 106 may be configured to receive the output of ALU 108, which may be MUXed with data from input FIFO 102. A byte [0] of the 256 byte data block $D_0$ (i.e., $D_0[0]$) may be sent from input FIFO 102 through circuit 100 and back to MUX 104. This byte $D_0[0]$ may be XORed with the corresponding byte from $D_1$ (i.e., $D_1[0]$) via ALU 108 and the first result may be subsequently stored in the first entry of buffer 106. Similarly, intermediate data bytes from the first disk block (e.g., $D_0[1]$) may be XORed with intermediate data bytes from the second disk block ($D_1[1]$) and this intermediate result may be stored in the second entry of buffer 106 and so on. These results may be used to generate RAID syndromes such as P, Q, partial P and partial Q. For example, a P computation may be performed using a standard XOR operation while a Q computation may be performed by selecting a galois field XOR operation.

Results buffer 106 may be configured to store a number of entries. For example, in some embodiments buffer 106 may be capable of storing 32 entries of 64-bit quadwords (i.e., 8 bytes each). As used herein, a quadword may correspond to a 64-bit number, a word may correspond to a 16-bit number and a longword may correspond to a 32-bit number. Results buffer 106 may be used in the generation of both the P and Q syndromes and may also be used as both a source and destination for 64-bit XOR and Galois field operations.

ALU 108 may be configured to perform Galois field arithmetic operations used in numerous types of RAID operations. ALU 108 may also be capable of performing in XOR-mode for less computationally intensive operations such as RAID-5 and Dual-XOR RAID 6 acceleration. With each successive cycle, results from ALU 108 may accumulate into results buffer 106. In some embodiments, ALU 108 may be configured to include a number of different circuits operating in a parallel arrangement (e.g., the GF circuitry shown in FIG. 2). ALU 108 may also be configured to operate upon a data set size of 256 bytes. However, as necessary, software may request operations on a data set of an arbitrary size. For example, if a data set of greater than 256 bytes is requested (e.g., 512 bytes), a microengine (not shown) may break the request into a series of operations on data sets of 256 bytes. In some embodiments, a special addressing mode may be used to access the first 256 bytes of D0, D1, etc.

Circuitry 100 may further include AND circuitry 110, which may be used to perform multiplication operations. For example, AND circuitry 110 may be used to perform the multiplication of a data disk D from input FIFO 102 with a co-efficient byte m from register 112 to generate a plurality of ANDed results using the following technique. In some embodiments, results buffer 106 (i.e., ACC in the example below) may have 32 entries of 64-bit quadwords. The computation of ACC[ ]=m*D[ ] may be performed as shown below.

ACC[i]=m*D[i]//i=0 through 31 (this may be implemented in 8 cycles per "i" using the 8 individual bits of m)

$$ACC[i] = (m0 \oplus m1*g \oplus m2*g^{\wedge}2 \oplus \ldots m7*g^{\wedge}7)*D[i]$$

$$= m0*D[i] \oplus g*[m1*D[i] \oplus g*[m2*D[i] \oplus \ldots$$

$$g*[m7*D[i] \oplus ZERO]\ldots]]$$

This example shows the repeated application of an a*g+b mod Galois-Field polynomial operation performed 8 times. The ANDed results (e.g., m*D above) may be XORed to generate a final result, which may be used to recover data disk blocks. In some embodiments the ANDed results may be multiplied by another polynomial such as the generator g before or after the XOR operation. In this embodiment, a MUX may select mj*D[i] for j=7 through 0, in decreasing order. Circuitry 100 may perform 8 iterations per incoming data-word to generate the multiplication with minimal area overhead for MUX 104 and bit counter 114. Bit counter 114 may be configured to hold a write-pointer at a certain location within results buffer 106. For example, bit counter 114 may hold the write pointer for 8 cycles until each data word is processed.

Figure 2:
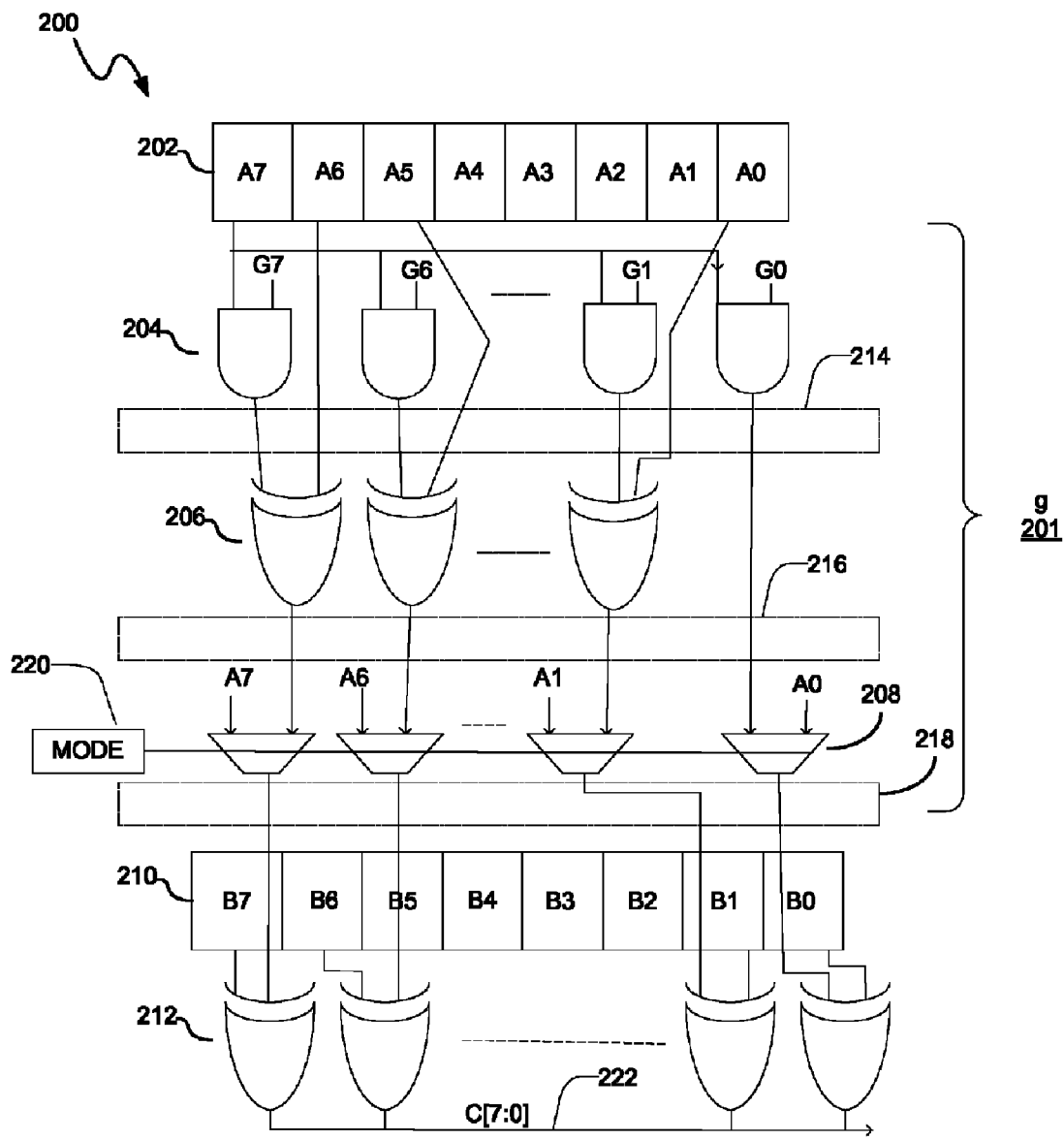
FIG. 2 is a diagram showing an exemplary embodiment of Galois-field circuitry.

FIG. 2 shows an embodiment of GF circuitry 200, which may be located within ALU 108. GF circuitry 200 may include a first register 202, AND circuitry 204, first XOR circuitry 206, MUX (multiplexer) circuitry 208, a second register 210 and second XOR circuitry 212. AND circuitry 204, first XOR circuitry 206 and MUX circuitry 208 may collectively form generator circuitry 201 configured to perform generator (g) operations in a Galois-field computation. The first register 202 may comprise an 8-bit register (e.g., bits A7, . . . , A0) and may be configured to store a first byte of data from a first data disk of a RAID system (not shown in this Figure). AND circuitry 204 may include a plurality of AND gates. In some embodiments, AND circuitry 204 may include 8 AND gates, one for each bit of the first register 202. AND circuitry 204 may be configured to AND the most significant bit (MSB) of the first data byte stored in register 202 with each bit of an 8-bit Galois-field polynomial (represented bit-wise in this Figure as G7, G6, . . . , G1, G0) to generate a first intermediate output 214. In this example, the Galois-field polynomial may be stored in a register and may include a specific primitive polynomial such as the 11 D and/or other primitive Galois-field polynomials.

First XOR circuitry 206 may include a plurality of XOR gates. In some embodiments, first XOR circuitry 206 may include seven (7) XOR gates, and each XOR gate may be configured to XOR the remaining bits, respectively, of the first data bytes (e.g., the least significant bits) with the first intermediate output 214 to generate a second intermediate output 216. The second intermediate output 216 may be a byte long and include the least significant bit of the first intermediate output 214.

MUX circuitry 208 may include a plurality of MUX circuits. In some embodiments, MUX circuitry 208 may include 8 MUX circuits, and each MUX circuit may be configured to MUX the second intermediate output 216 with each respective bit of the second data byte (stored in register 202). The second register 210 may comprise an 8-bit register (e.g., bits B7, . . . , B0) and may be configured to store a second data byte from a second data disk of a RAID system (not shown in this Figure). Second XOR circuitry 212 may include a plurality of XOR gates. In this example, second XOR circuitry may include eight (8) XOR gates, and each XOR gate may be configured to XOR respective bits of the third intermediate output 218 with respective bits of the second data byte (stored in register 210) to generate a fourth intermediate output. The output 222 of the second MUX circuitry 212 may be used, at least in part, to generate a Q syndrome.

Some embodiments may also include mode circuitry 220. Mode circuitry 220 may control the operation of MUX circuitry 208 for Galois-field operations (to generate a Q syndrome) or for parity operations (to generate P). If mode circuitry 220 controls MUX circuitry 208 for Galois-field operations, then each MUX circuit may operate as described above. If mode circuitry 220 controls MUX circuitry 208 to generate parity (P), then the output of MUX circuitry 208 may be contents of register 202, and the parity value (P) may be generated by XORing the contents of register 202 with the contents of register 210, using for example, the second XOR circuitry 212. In this instance, output 222 may be the parity data (P) calculated for a given RAID protocol.

Depending on the number of storage devices in a given RAID system, the GF circuitry 200 of FIG. 2 may be configured for iterative operations. For example, for n-number of storage devices in a RAID system, the next iterative operations of GF circuitry 200 may be to replace the contents of register 202 with output 222 and replace the contents of register 210 with a data byte from the next storage device, and repeating the AND, XOR and MUX operations (described above) for each storage device in the RAID system. When the last storage device is reached, output 222 may be the Q syndrome which may be written to an appropriate sector on one of the storage devices, according to the RAID protocol being used.

The following is an example of the operations of GF circuitry 200 to generate a Q syndrome for a selected stripe on a RAID system with three data disks (D0, D1 and D2). EQ. 2, above, may be factorized to yield:

$$Q = D0 \oplus g(D1 \oplus g*D2).$$

EQ. 4)

Here, D0, D1 and D2 may refer to three data disks and g corresponds to the generator.

A bit-wise form of EQ. 4 may be expressed as:

$$Q = D0 \oplus g \cdot (D1 \oplus (g(D2))). \quad \text{EQ. 5}$$

Initially, a byte of data from D2 may be loaded into register 202 and a byte of data from D1 may be loaded into register 210. Evaluating EQ. 5 from the innermost parentheses outward, the expression g(D2) may be calculated using AND circuitry 204, XOR circuitry 206 and MUX circuitry 208, and may be represented by the third intermediate output 218. The expression (D1⊕(g(D2))) may be calculated by XORing third intermediate result 218 with the D1 data byte (stored in register 210), and may be represented by output 222. The expression g.(D1⊕(g(D2))) may be calculated by loading output 222 into register 202 and repeating the operations of AND circuitry 204, XOR circuitry 206 and MUX circuitry 208 to generate another third intermediate result (218', not shown). A byte of data from D0 may be loaded into register 210, and the expression D0⊕g. (D1⊕(g(D2)) may be evaluated by XORing the third intermediate result 218' D0 to yield the Q syndrome.

Of course, this is an example of operations for a 3-disk RAID system, and these concepts may be extended to a RAID system with n-number of disks. Further, while the GF circuitry 200 of FIG. 2 depicts operations in an 8-bit data path, in alternative embodiments the circuitry of FIG. 2 may be configured for other bit-depths, for example, 16-bit, 32-bit, and/or 64-bit data paths. In such alternate embodiments, the Galois-field polynomial may correspondingly include a 16-bit, 32-bit and/or 64-bit primitive polynomial.

Pseudocode for both the Galois-field mode (to generate the Q syndrome) and bit-wise XOR mode (to generate parity P) are shown below. As described above, the mode selection circuitry 220 may be used to control selection of the mode of MUX circuitry 208. For example, if MUX circuitry 208 is set to Galois-field mode the 8 most significant bits (MSB) of global variable G7-G0 may be designated as a polynomial (e.g., a galois-field polynomial (GFP)).

In Galois-field mode, c[63:0]=a[63:0] CONFIG_XOR b[63:0] may be calculated as:

```
For (i=0; i<8; i++){
   c[7+8i:8i] = GF-XOR(a[7+8i:8i], b[7+8i:8i]);
}
// performs a*x + b mod GFP in galois-field (28)
char GF-XOR(char a, char b){ // each char is 1 byte
char t;
// check msb of a
If (a(7)==1) {t = (a <<1) ⊕ GFP;}
else { t = (a <<1);}
// <<1 is logical shift left by 1, ⊕ is regular bit-wise xor function
return (t ⊕ b);
}
```

The iterative operations set forth above may be performed in parallel using 1 cycle, thus each iteration may represent one byte-slice and there may be 8 such byte-slices implemented, for example, in hardware. These 8 byte slices (i.e. 64 bits) may be delivered to XOR circuitry 212, as described above. Alternatively, in bit-wise mode, c[63:0]=a[63:0] CONFIG_XOR b[63:0] may be calculated using a similar approach to the bit-wise ⊕ operation used previously: $c[i]=a[i] \oplus b[i]$ for all i in [63:0].

Figure 3:
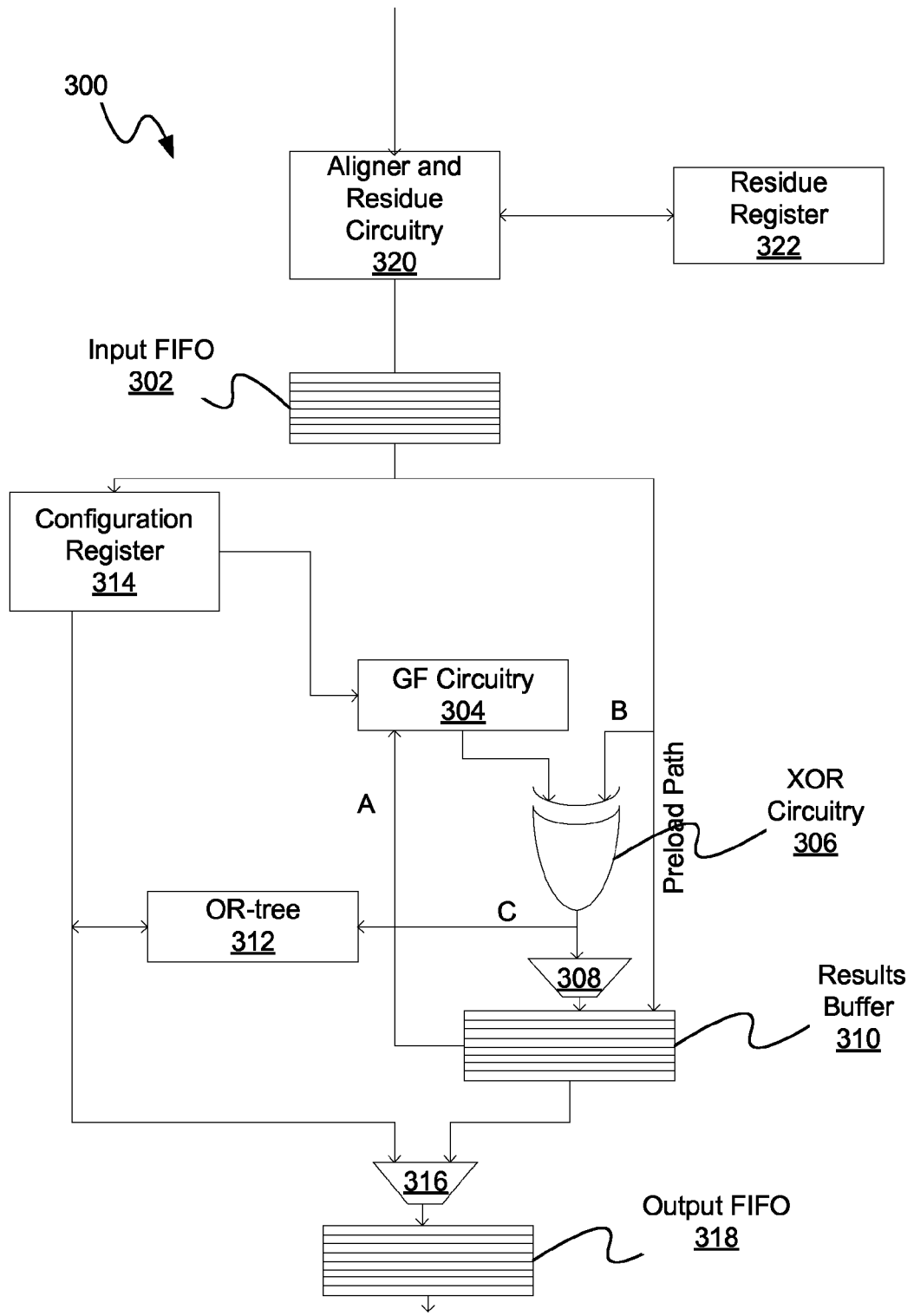
FIG. 3 is a diagram of yet another exemplary embodiment of a system in accordance with the present disclosure.

FIG. 3 shows an embodiment of storage accelerator circuitry 300 in accordance with the present disclosure. Storage accelerator circuitry 300 may include, inter alia, input FIFO 302, GF circuitry 304, XOR circuitry 306, MUX 308 and results buffer 310 as previously shown. GF circuitry 304 may include a number of individual circuits each configured to operate on a piece of data (e.g., a byte). A mode bit (as shown in FIG. 2) may select either A (e.g., a word from results buffer 310) or A*X mod GF polynomial G. The result may be XOR'ed with B from input FIFO 302 in order to generate result C. C may then be written to results buffer 310. The entries of results buffer 310 may be MUXed via multiplexer 316 with additional data and sent to output FIFO 318.

Storage accelerator circuitry 300 may also include an OR-tree 312 (e.g., 64-bits) that may be configured to check if C is zero. OR-tree 312 may be configured into multiple stages of Byte-level compares. After the first stage a byte mask may be added to C prior to the final stage compare. The byte mask may only be required for lengths that are smaller than 8 bytes in the final word. The result of the OR function may set a status bit in a "sticky" manner, called a miscompare flag. Software may initially load a value of zero into this flag. However, the value of the flag may be set to one if a miscompare of a word is detected.

To facilitate background data scrubbing of RAID caches, storage accelerator circuitry 300 may include support for a zero result buffer check. The zero result buffer check may ensure that previously calculated checksums are still valid (i.e., neither the data nor the check disks contain non-correlated bit errors).

Storage accelerator circuitry 300 may further include a configuration register 314, which may be in communication with input FIFO 302 and GF circuitry 304. Configuration register 314 may manage numerous functions associated with storage accelerator circuitry 300. For example, a microengine (not shown) may program configuration register 314 using various commands (e.g., clear the miscompare states flag and/or reset the read/write pointer of results buffer 310 to zero). Configuration register 314 may include a configuration bit to control write-back into results buffer 310.

Storage accelerator circuitry 300 may additionally include aligner and residue circuitry 320, which may be configured to receive a number of bits (e.g., 64). Any data that is not well aligned within the boundary (e.g., 8 byte) may be sent to residue register 322. In some embodiments, residue register 322 may be configured to store a number of bits, such as 57. Once the data is properly aligned it may be sent to input FIFO 302.

A variety of different instructions may be executed using the embodiments depicted in FIGS. 1-3. The following list shows a few examples of the types of instructions that may be used in accordance with this disclosure:

set_slice_config: loads configuration register 314 with a quadword from memory
   set_state: loads up the initial state of results buffer 106
   slice_wr: writes data to the results buffer in a fixed order
   slice_final: issued after a set_state or slice_wr, indicating the length of data block and that the current block has been processed
   flush_state: prepares to write out results buffer 106
   slice_rd: stores the contents of results buffer 106 or status_bit into memory
   flush_status: prepares to write out status_bit from compare operation An example of the pseudocode for a P calculation incorporating some of these commands is provided below:

```
// len is assumed to be 256 bytes for all set_state, slice_wr, slice_rd
commands
    set_slice_config (mode = XOR, updStateEnable = 1)
    set_state (zeroBufferAddr) /* SharedMemory Region containing
    256 bytes
of zeros */
    for i = nDisks-1 to 0
        slice_wr (dataDisk[i])
        slice_final
    flush_state( )
    slice_rd(PDisk)
```

A Q computation may be performed using a similar technique but changing the set_config mode to Galois Field XOR. Other computations such as a partial P and partial Q operations may also be performed by varying the pseudocode slightly. In some embodiments the exact same program may be used to calculate P & Q (i.e., a different configuration word pointer may specified as an argument into the function). The exact same program may also be used to compute partial P and partial Q.

The configuration quadword (e.g., 64 bit) may be stored in shared memory. This quadword may include information in the lower 32 bits, such as the mode of XOR, whether or not results buffer 310 must be written, the correct GF(8) polynomial for reduction and the multiplier (m), if a multiplication mode is chosen. A set_slice_config command may be issued with the address pointing to the configuration quadword constructed previously. This command may take the 64-bit quadword from the shared memory and store the value in configuration register.

The embodiments of FIGS. 1-3 may be used to perform RAID-6 operations efficiently using firmware microcode. The examples below assume n data disks (n<=255) $D_0 \ldots D_{n-1}$, and g is the generator of the Galois Field polynomial. In this example, each disk buffer length (len) may equal 256 bytes.

1. P and Q full stripe computation: a-d below provide a possible sequence of operations for computing Q (P may be similar except for the mode-bit):
   a. Set ALU mode to GF-XOR
   b. Init ACC=$D_{n-1}$
   c. For (i=n-2; i>=0;i--) {ACC=g*ACC⊕$D_i$;//this may be performed in a loop in (e.g., len/8) cycles}
   d. Q=ACC 2. P and Q partial updates: a-e below illustrate one possible example of a partial Q update (P may be similar except for setting mode-bit)
   a. Let the array of buffers $B_i$ be computed as $B_i$=old_value($D_i$)⊕new_value($D_i$)//For the disks that did not change, $B_i$ can be set to point to a predefined zero buffer
   b. Set mode bit to GF-XOR (for Q)
   c. Init ACC=$B_{m-1}$ (where m<=n is defined such that all $B_i$ for i>=m are zero buffers)
   d. For (i=m-2; i>=0;i—) {ACC=g*ACC⊕$B_i$;}
   e. Q=ACC⊕old_value(Q);

3. Single drive recovery (i.e., if 1 data drive is lost): use normal XOR parity to recover (flow may be similar to 1 above). If a syndrome disk is lost, compute the syndrome using flow 1.

4. Double-drive recovery (i.e., 2 syndrome disks are lost): recompute the syndromes using flow 1.

5. Double-drive recovery (i.e., lose Q syndrome, 1 data disk): recompute data drive with P syndrome using flow 1, and then compute Q using flow 1.

6. Double-drive recovery (i.e., lose P syndrome, 1 data disk): let a be the index of the missing data disk.
   a. Compute $Q_a$ as if disk a was zero using flow 1 (use $D_{a=0}$ during the computation)
   b. We know (Q⊕$Q_a$)=$g^a$*$D_a$. Assume we have the parameter R1=$g^{-a}$ precomputed. Thus we compute ACC=(Q⊕$Q_a$)
   c. ACC=R1*ACC//general multiplication of ACC by a byte-coefficient R1
   d. $D_a$=ACC 7. Double drive recovery (i.e., 2 data disks are lost): if the indices are i, j with i<j, it can be shown that we can recover $D_j$=R2*(Q⊕$Q_{ij}$)⊕R3*(P⊕$P_{ij}$), where $P_{ij}$ is computed as full-stripe P compute with zero buffers at locations i,j. Similarly for $Q_{ij}$. The byte-parameters R2, R3 are precomputed and defined to be R2=$(g^i⊕g^j)^{-1}$ and R3=R2*$g^i$. $D_i$=(P⊕$P_{ij}$)⊕$D_j$.
   a. Compute full-stripe Q assuming disks i,j are zero using flow 1; call this $Q_{ij}$
   b. Compute full-stripe P assuming disks i,j are zero using flow 1; call this $P_{ij}$
   c. Compute A=(Q⊕$Q_{ij}$), B=(P⊕$P_{ij}$)
   d. Compute $D_j$=A*R2⊕B*R3//2 multiplications by byte-coefficients required
   e. Compute $D_i$=(P⊕$P_{ij}$)⊕$D_j$ The embodiments described herein may be implemented, for example, in an integrated circuit (IC) which may include, for example, a System-on-a-Chip (SoC), an application specific integrated circuit (ASIC) and/or a field programmable gate array (FPGA). "Integrated circuit", as used in any embodiment herein, means a semiconductor device and/or microelectronic device, such as, for example, but not limited to, a semiconductor integrated circuit chip.

Figure 4:
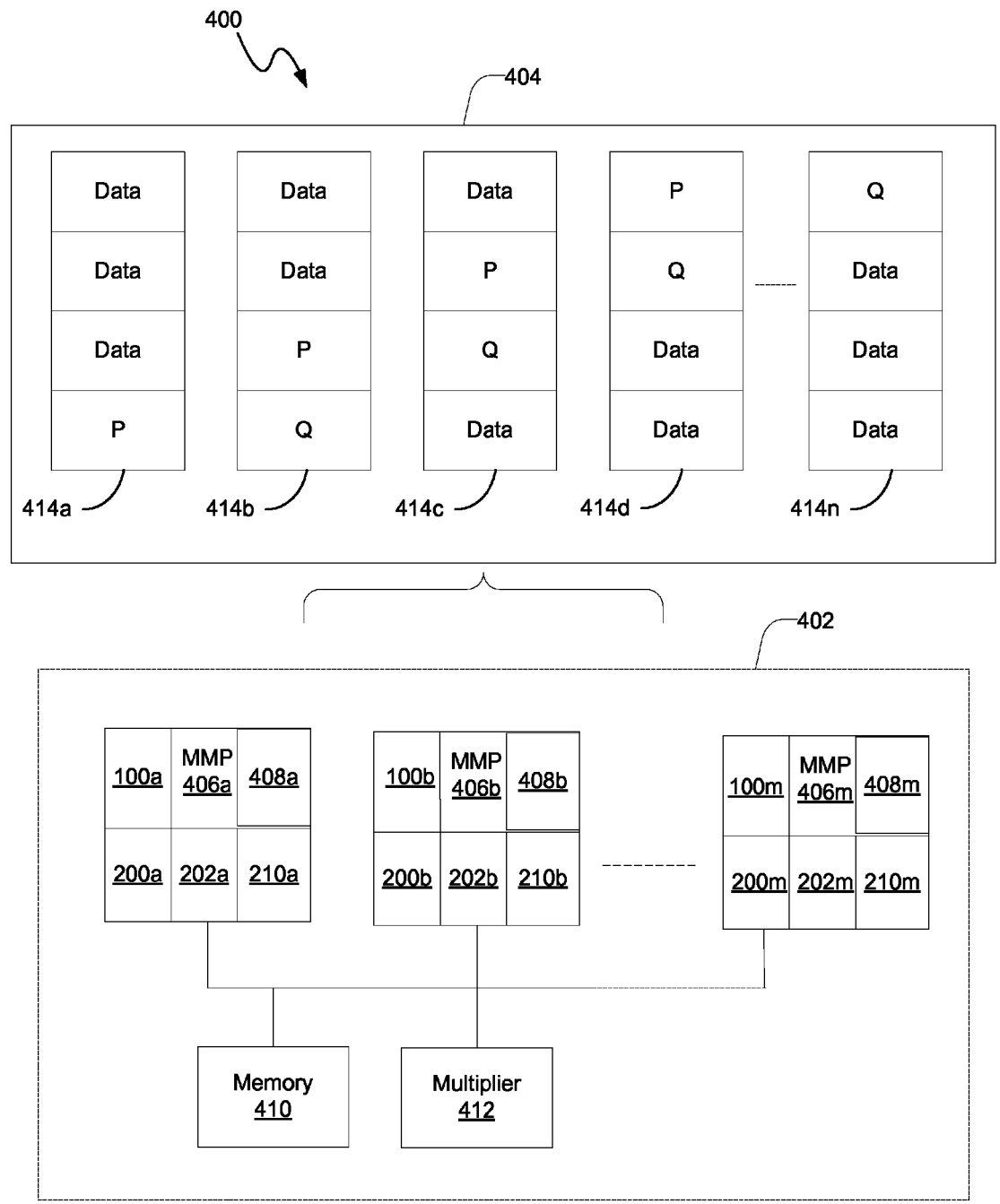
FIG. 4 is a block diagram of another exemplary embodiment of the present disclosure.

Referring now to FIG. 4, one exemplary system embodiment 400 including an integrated circuit is depicted. In this embodiment, IC 402 may be configured to generate P and Q data on a RAID system 404. The IC 402 of this embodiment may include a plurality of modular math processors (MMP) 406a, 406b, ..., 406m. MMP 406a may include circuitry 100a, GF circuitry 200a, first register 202a and second register 210. In addition, MMP 406a may include a third register 408a configured to store a Galois-field polynomial, such as the 11 D and/or 14D polynomial (represented as G7-G0 in FIG. 2). In at least one embodiment, register 408a may be reloadable so that any Galois-field polynomial may be used. MMPs 406b, ..., 406m may be similarly configured. IC 402 may also include memory 410 and multiplier 412. Memory 410 may be configured to store RAID-related data, which may include, for example, data bytes from a plurality of RAID storage devices.

Multiplier 412 may be configured to perform multiplication operations during Q syndrome calculations. For example, to generate the Q syndrome, in some embodiments, a general computation of the form ($c_0$*$D_0$⊕$c_1$*$D_1$⊕$c_2$*$D_2$⊕ ... $c_n$*$D_n$) may be used. The "c" coefficients may each be an 8-bit polynomial. This multiplication may be performed using multiplier 412, while the remaining computations may be performed using circuitry 100a-100m and/or GF circuitry 200a-200m, as described above. Further, the operations described herein may be performed in parallel using the appropriate bytes from each disk block. In some embodiments, IC 402 may be configured to operate in a 64-bit data path. For example, if m=8, 8 MMP circuits may operate in parallel concurrently in a 64-bit data path.

RAID system 404 may include a plurality of storage devices 414a, 414b, 414c, ..., 414n. IC 402 may be configured to stripe and interleave data, parity data (P) and Galois-field syndrome data (Q) across the devices, in a manner shown in this figure and/or according to a RAID level/protocol implemented by the RAID system 404.

Figure 5:
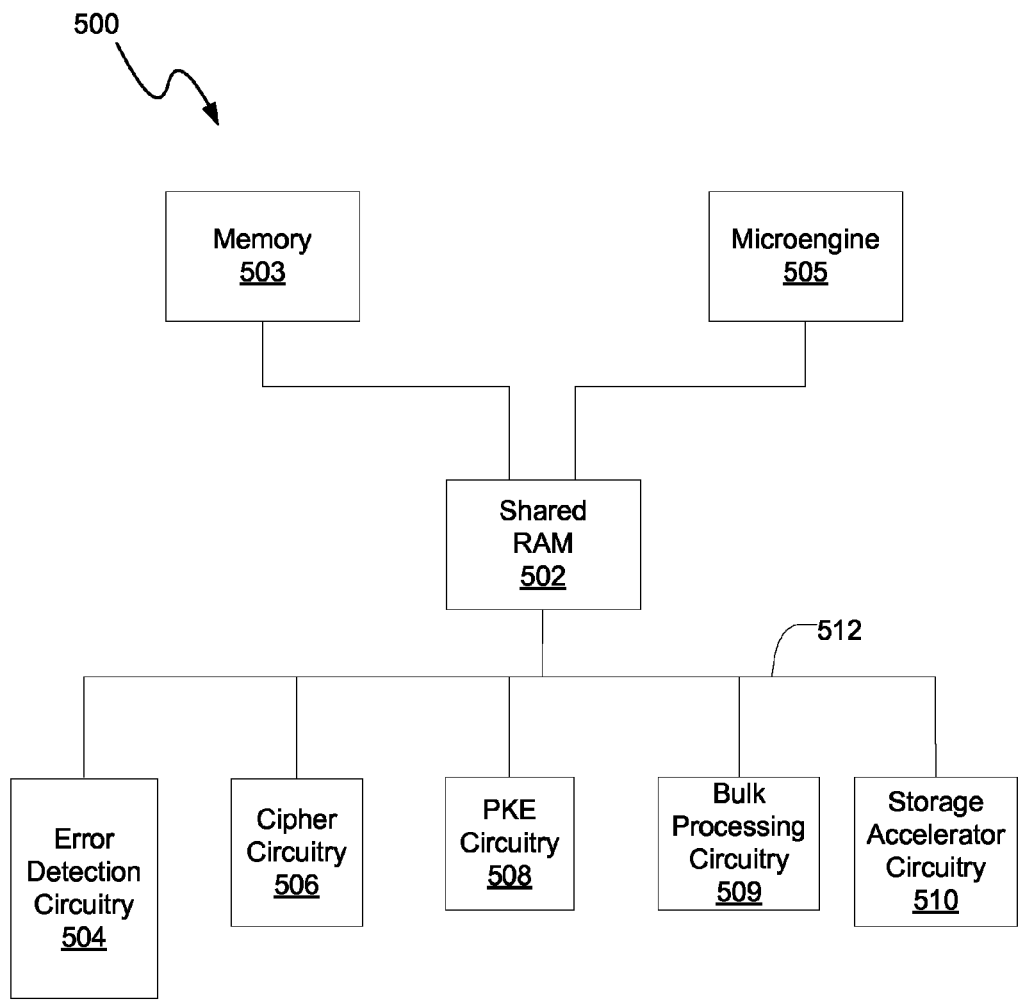
FIG. 5 is a block diagram of still another exemplary embodiment of the present disclosure.

Referring now to FIG. 5, some of the embodiments described herein may be included within security processing circuitry 500. Security processing circuitry 500 may be configured to perform encryption operations which may include modular exponentiation operations for generating a public key. Security processing circuitry 500 may include shared RAM 502 operatively connected to memory (e.g. DRAM) 503, error detection circuitry 504, microengine 505, cipher circuitry 506, public key encryption (PKE) circuitry 508 and bulk data processing circuitry 509 through internal bus 512. Of course, other components are also within the scope of the present disclosure.

Error detection circuitry 504 may be configured to perform hash functions that may be used as a redundancy check or checksum. Some types of redundancy checks could include, but are not limited to, parity bits, check digits, longitudinal redundancy checks, cyclic redundancy checks, horizontal redundancy check, vertical redundancy checks, and cryptographic message digest. Security processing circuitry 500 may include both private and public key modules. Cipher circuitry 506 may be configured to generate private keys, which may include execution of symmetric and/or private-key data encryption algorithm such as the data encryption standard (DES) or advanced encryption standard (AES). PKE circuitry 508 may be configured to execute an asymmetric key encryption algorithm and may include generating a public-key/private-key pair. Storage accelerator circuitry 510 may be configured to include any or all of the embodiments described herein, such as those described in FIGS. 1-4.

Microengine 505 may be configured to control the operations of shared RAM 502. For example, microengine 505 may push D0, D1, etc. from shared RAM 502 into storage accelerator circuitry 510 (e.g., input FIFO 102 of FIG. 1). Microengine 505 may be capable of executing a variety of different commands such as those listed above. Microengine 505 may utilize read and write pointers to access data within shared RAM 502 or other storage devices.

Figure 6:
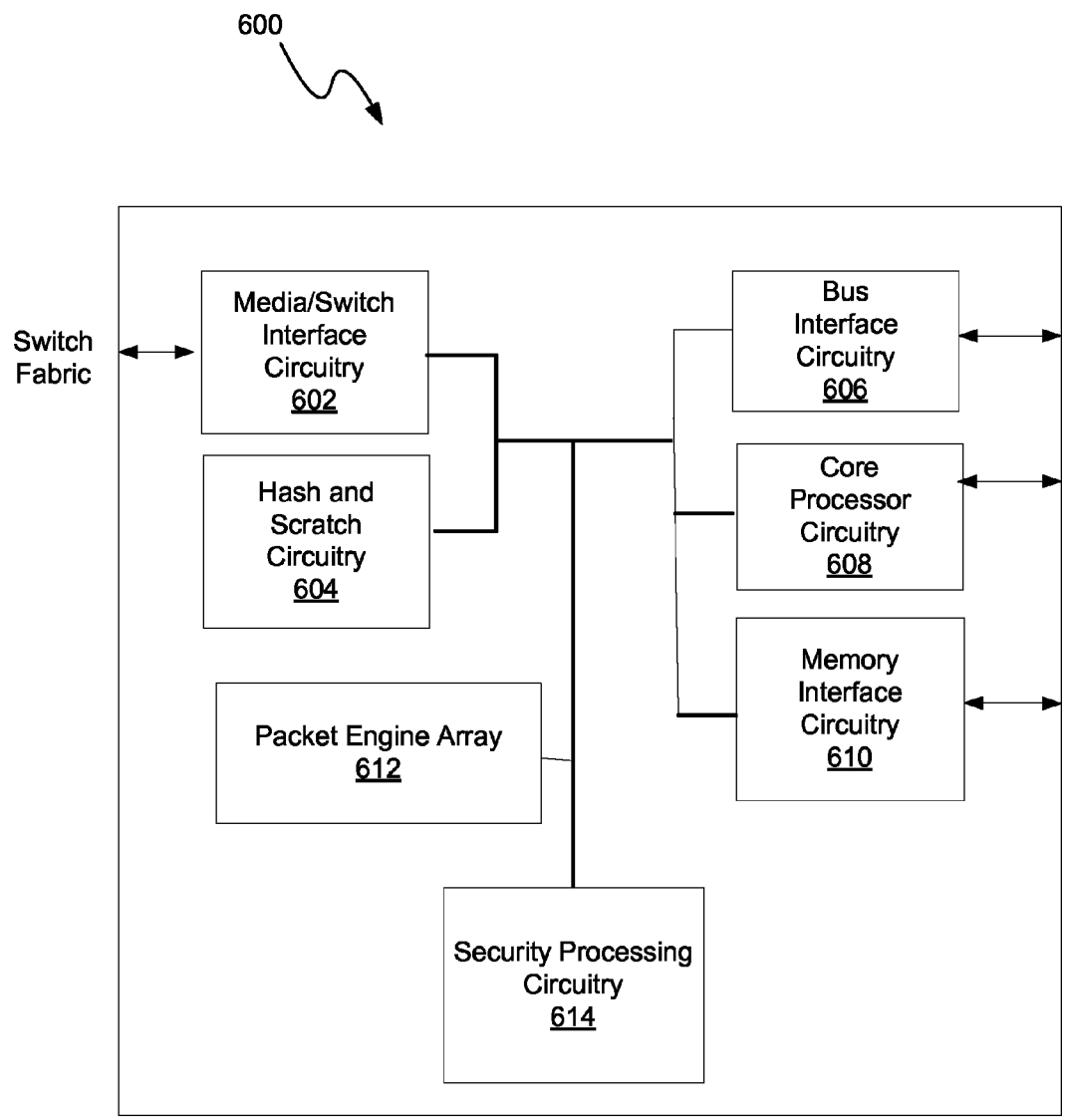
FIG. 6 is a block diagram of an additional exemplary embodiment of the present disclosure.

The methodology of FIGS. 1-5 may be implemented, for example, in a variety of multi-threaded processing environments. For example, FIG. 6 is a diagram illustrating one exemplary integrated circuit embodiment (IC) 600 in which may be configured to include any or all of the embodiments of FIGS. 1-5. "Integrated circuit", as used in any embodiment herein, may refer to a semiconductor device and/or microelectronic device, such as, for example, but not limited to, a semiconductor integrated circuit chip. The IC 600 of this embodiment may include features of an Intel® Internet eXchange network processor (IXP). However, the IXP network processor is only provided as an example, and the operative circuitry described herein may be used in other network processor designs and/or other multi-threaded integrated circuits.

IC 600 may include media/switch interface circuitry 602 (e.g., a CSIX interface) capable of sending and receiving data to and from devices connected to the integrated circuit such as physical or link layer devices, a switch fabric, or other processors or circuitry. IC 600 may also include hash and scratch circuitry 604 that may execute, for example, polynomial division (e.g., 48-bit, 64-bit, 128-bit, etc.), which may be used during some packet processing operations. IC 600 may also include bus interface circuitry 606 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from IC 600 or external memory. The IC may also include core processor circuitry 608. In this embodiment, core processor circuitry 608 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 608 may comprise other types of processor core circuitry without departing from this embodiment. Core processor circuitry 608 may perform "control plane" tasks and management tasks (e.g., look-up table maintenance, etc.). Alternatively or additionally, core processor circuitry 608 may perform "data plane" tasks (which may be typically performed by the packet engines included in the packet engine array 612, described below) and may provide additional packet processing threads.

Integrated circuit 600 may also include a packet engine array 612. The packet engine array may include a plurality of packet engines. Each packet engine may provide multi-threading capability for executing instructions from an instruction set, such as a reduced instruction set computing (RISC) architecture. Each packet engine in the array 612 may be capable of executing processes such as packet verifying, packet classifying, packet forwarding, and so forth, while leaving more complicated processing to the core processor circuitry 608. Each packet engine in the array 612 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 600 may also include memory interface circuitry 610. Memory interface circuitry 610 may control read/write access to external memory. Machine readable firmware program instructions may be stored in external memory, and/or other memory internal to the IC 600. These instructions may be accessed and executed by integrated circuit 600. When executed by integrated circuit 600, these instructions may result in integrated circuit 600 performing the operations described herein, for example, operations described with reference to FIG. 8.

Figure 7:
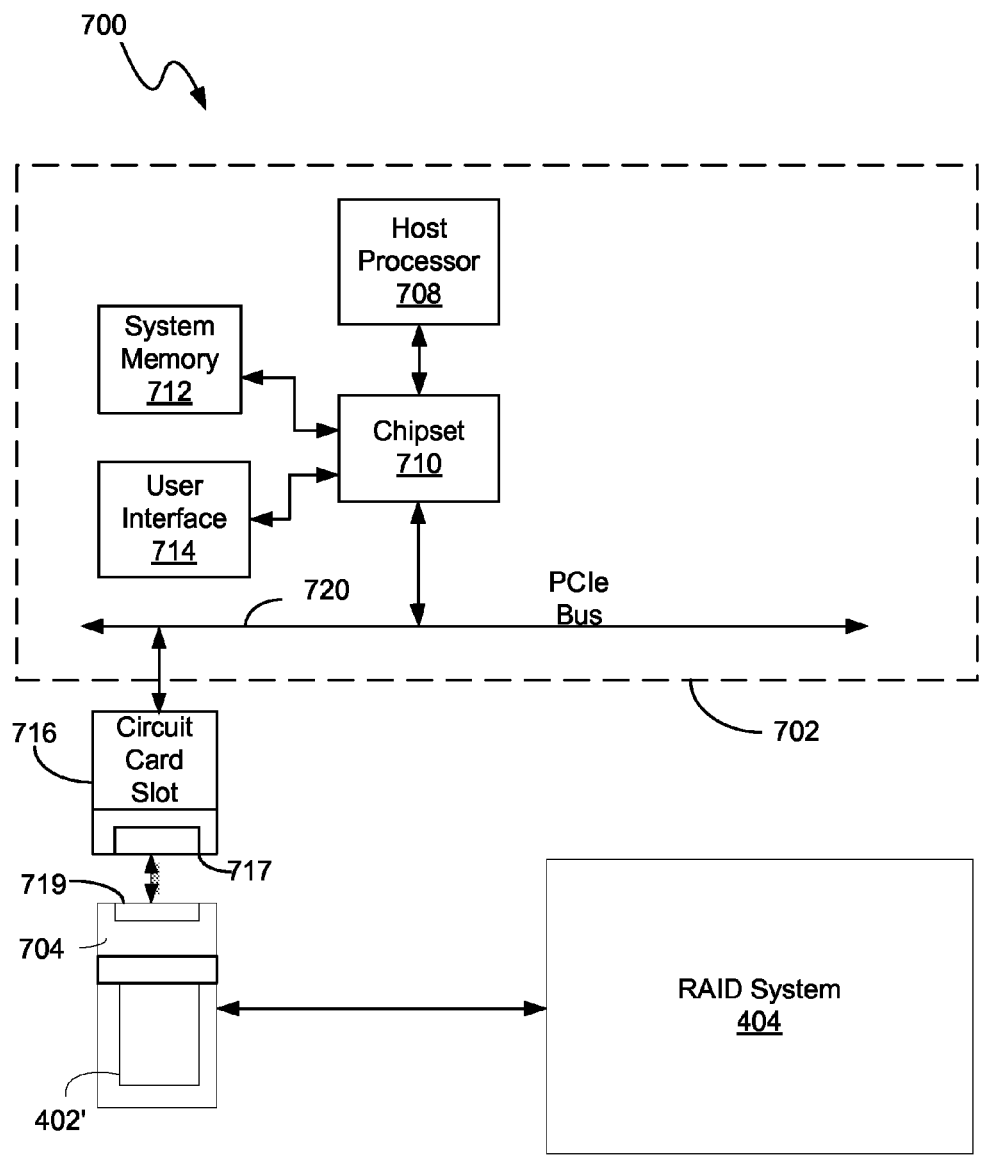
FIG. 7 is a block diagram of yet another exemplary embodiment of the present disclosure.

FIG. 7 illustrates another exemplary system embodiment 700. The system 700 may generally include a host system 702 a circuit card 704 and a RAID system 304. Host system 702 may include, for example, host processor 708, a bus 720, a user interface system 714, a chipset 710, system memory 712, a circuit card slot 716, and circuit card 704 configured to communicate with RAID system 304. The host processor 708 may include any variety of processors known in the art such as an Intel® Pentium® IV processor commercially available from the Assignee of the subject application. The bus 720 may include various bus types to transfer data and commands. For instance, the bus 720 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 720 may also comply with the PCI-X Specification Rev. 1.0a, Jul. 24, 2000, available from the aforesaid PCI Special Interest Group, Portland, Oreg., U.S.A.

The user interface system 714 may include a variety of devices for human users to input commands and/or data and to monitor the system such as a keyboard, pointing device, and video display. The chipset 710 may include host bridge/hub system (not shown) that couples the processor 708, system memory 712, and user interface system 714 to each other and to the bus 720. Chipset 710 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 708, system memory 712, chipset 710 and circuit card slot 716 may be integrated onto one circuit board.

The circuit card 704 may be constructed to permit it to be inserted into slot 716. When the circuit card 704 is properly inserted into slot 716, connectors 719 and 717 become electrically and mechanically coupled to each other. When connectors 719 and 717 are so coupled to each other, the card 704 becomes electrically coupled to bus 720 and may exchange data and/or commands with system memory 712, host processor 708, and/or user interface system 714 via bus 720 and chipset 710. Alternatively, without departing from this embodiment, the operative circuitry of the circuit card 704 may be included in other structures, systems, and/or devices. These other structures, systems, and/or devices may be, for example, in the host system 702, coupled to the bus 720.

Circuit card 704 may include IC 402' to control the operation of RAID system 404. This may include, for example, generating Q syndrome (Q) and parity data (P) for the storage devices contained within the RAID system 404 (as described above). In addition, IC 402' may be configured to communicate with RAID system 404 using a plurality of communication protocols.

For example, if a Fibre Channel communication protocol is used by IC 402' to exchange commands and/or data with RAID system 404, it may comply or be compatible with the interface/protocol described in ANSI Standard Fibre Channel Physical and Signaling Interface-3 X3.303:1998 Specification. Alternatively or additionally, if a serial ATA (S-ATA) protocol is used by IC 302' to exchange commands and/or data with RAID system 404, it may comply or be compatible with the protocol described in "Serial ATA: High Speed Serialized AT Attachment," Revision 1.0, published on Aug. 29, 2001 by the Serial ATA Working Group. Further alternatively or additionally, if a serial attached small computer system interface (SAS) protocol is used by IC 402' to exchange commands and/or data with RAID system 404, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or later-published versions of the SAS Standard. Of course, other alternative communication protocols and/or after-developed communication protocols may be used by IC 402' without departing from this embodiment, and such alternative and/or after-developed communications protocols shall be deemed equivalent communications protocols.

To that end, RAID system 404 may include a plurality of storage devices that may comply or are compatible with SATA, SAS and/or FC communication protocols. For example, in some embodiments, RAID system 404 may include a plurality of SATA disk drives, and thus, IC 402' may be configured to exchange commands and data with RAID system 404 using a SATA communications protocol.

Figure 8:
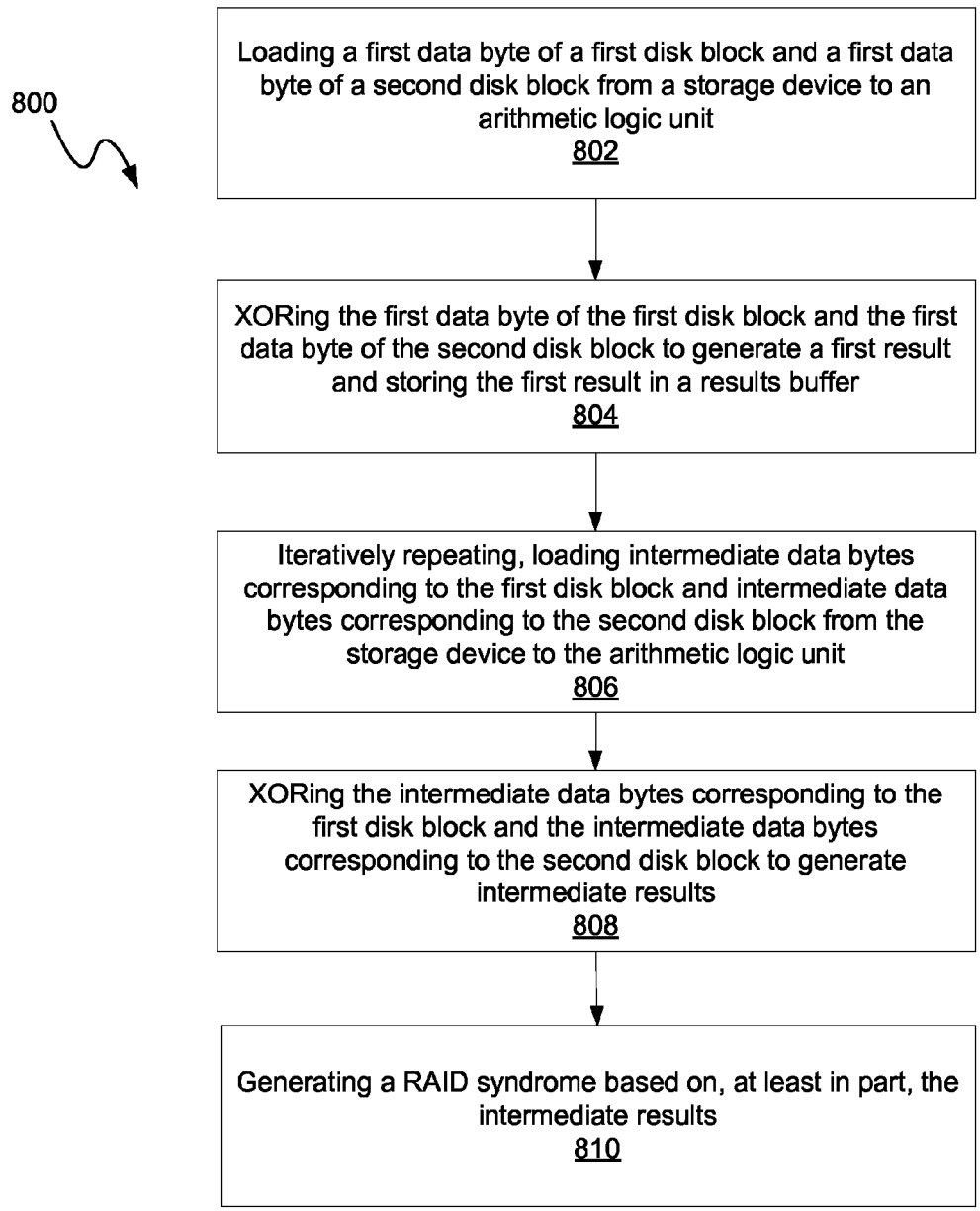
FIG. 8 is a flowchart of operations according to one embodiment of the present disclosure.

FIG. 8 illustrates a flowchart 800 of operations according to one embodiment. Operations may include loading a first data byte of a first disk block and a first data byte of a second disk block from a storage device to an arithmetic logic unit (802). The method may further include XORing the first data byte of the first disk block and the first data byte of the second disk block to generate a first result and storing the first result in a results buffer (804). The method may also include iteratively repeating, loading intermediate data bytes corresponding to the first disk block and intermediate data bytes corresponding to the second disk block from the storage device to the arithmetic logic unit (806). The method may additionally include XORing the intermediate data bytes corresponding to the first disk block and the intermediate data bytes corresponding to the second disk block to generate intermediate results (808) and generating a RAID syndrome based on, at least in part, the intermediate results (810).

As used in any embodiment described herein, "circuitry" may comprise, for example, singly or in any combination, hardwired circuitry, programmable circuitry, state machine circuitry, and/or firmware that stores instructions executed by programmable circuitry. While some of the embodiments are described herein in terms of AND, XOR and MUX logic, some of these circuits may alternatively be implemented using NAND and/or NOR logic, which may include, for example one or more inverter circuits. Also, the term "cycle" as used herein may refer to clock cycles. Alternatively, a "cycle" may be defined as a period of time over which a discrete operation occurs which may take one or more clock cycles (and/or fraction of a clock cycle) to complete. It should be understood at the outset that any of the operations and/or operative components described in any embodiment herein may be implemented in software, firmware, hardwired circuitry and/or any combination thereof.

Embodiments of the methods described above may be implemented in a computer program that may be stored on a storage medium having instructions to program a system (e.g., a machine) to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Additionally, the circuitry described herein and the operations described with reference to FIG. 8 may be executed on one or more integrated circuits of a computer node element, for example, executed on a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit.

The present disclosure may provide numerous advantages over the prior art. For example, embodiments described herein describe an area efficient technique for generating the P and Q syndromes used in various RAID calculations. Some embodiments may also include a efficient multiplication technique using minimal circuitry. This disclosure may be flexible in that it may be configured to perform efficient calculations to recover both the P and Q syndromes as well as single and double data disk recoveries.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus, comprising:
an integrated circuit (IC) configured to load a first data byte of a first disk block and a first data byte of a second disk block from a storage device to an arithmetic logic unit; the IC further configured to XOR the first data byte of the first disk block and the first data byte of the second disk block to generate a first result; the IC further configured to store the first result in a results buffer; the IC further configured to iteratively repeat loading intermediate data bytes corresponding to the first disk block and intermediate data bytes corresponding to the second disk block from the storage device to the arithmetic logic unit; the IC further configured to XOR the intermediate data bytes corresponding to the first disk block and the intermediate data bytes corresponding to the second disk block to generate intermediate results; the IC further configured to generate a RAID syndrome based on, at least in part, the intermediate results.

2. The apparatus according to claim 1, wherein the RAID syndrome is selected from the group consisting of P, Q, partial P and partial Q.

3. The apparatus according to claim 1, wherein the IC further includes a set of instructions capable of generating P, Q, partial P and partial Q.

4. The apparatus according to claim 1, wherein the XOR is a galois field XOR.

5. The apparatus according to claim 4, wherein the IC is further configured to generate a RAID Q syndrome based on, at least in part, the intermediate results.

6. The apparatus according to claim 1, wherein the IC further comprises AND circuitry, the AND circuitry configured to AND a disk byte from a disk block with a plurality of bits of a polynomial to generate a plurality of ANDED results.

7. The apparatus according to claim 6, wherein the plurality of ANDed results are XORed to generate a final result.

8. The apparatus according to claim 7, wherein the final result is used, at least in part, to recover data disk blocks.

9. A method, comprising:
loading a first data byte of a first disk block and a first data byte of a second disk block from a storage device to an arithmetic logic unit;
XORing the first data byte of the first disk block and the first data byte of the second disk block to generate a first result and storing the first result in a results buffer;
iteratively repeating, loading intermediate data bytes corresponding to the first disk block and intermediate data bytes corresponding to the second disk block from the storage device to the arithmetic logic unit;
XORing the intermediate data bytes corresponding to the first disk block and the intermediate data bytes corresponding to the second disk block to generate intermediate results; and
generating a RAID syndrome based on, at least in part, the intermediate results.

10. The method according to claim 9, wherein the RAID syndrome is selected from the group consisting of P, Q, partial P and partial Q.

11. The method according to claim 9, wherein the XOR is a galois field XOR.

12. The method according to claim 11, wherein generating a RAID syndrome comprises generating a RAID Q syndrome.

13. The method according to claim 9, further comprising ANDing a disk byte from a disk block with a plurality of bits of a polynomial via AND circuitry to generate a plurality of ANDED results.

14. The method according to claim 13, further comprising XORing the plurality of ANDed results to generate a final result.

15. The method according to claim 14, further comprising recovering data disk blocks, using at least in part, the final result.

16. An article comprising a storage medium having stored thereon instructions that when executed by a machine result in the following:
loading a first data byte of a first disk block and a first data byte of a second disk block from a storage device to an arithmetic logic unit;
XORing the first data byte of the first disk block and the first data byte of the second disk block to generate a first result and storing the first result in a results buffer;
iteratively repeating, loading intermediate data bytes corresponding to the first disk block and intermediate data bytes corresponding to the second disk block from the storage device to the arithmetic logic unit;
XORing the intermediate data bytes corresponding to the first disk block and the intermediate data bytes corresponding to the second disk block to generate intermediate results; and
generating a RAID syndrome based on, at least in part, the intermediate results.

17. The article according to claim 16, wherein the XOR is a galois field XOR.

18. The article according to claim 17, wherein generating a RAID syndrome comprises generating a RAID Q syndrome.

19. The article according to claim 16, further comprising ANDing a disk byte from a disk block with a plurality of bits of a polynomial via AND circuitry to generate a plurality of ANDED results.

20. The article according to claim 19, further comprising XORing the plurality of ANDed results to generate a final result.

21. The article according to claim 20, further comprising recovering data disk blocks, using at least in part, the final result.

22. A system, comprising:
a RAID system comprising a plurality of serial-ATA (SATA) storage devices; and an integrated circuit (IC) configured to control the operation of, and exchange commands and data with, the RAID system, said IC is further configured to load a first data byte of a first disk block and a first data byte of a second disk block from at least one of the plurality of SATA storage devices to an arithmetic logic unit; the IC further configured to XOR the first data byte of the first disk block and the first data byte of the second disk block to generate a first result; the IC further configured to store the first result in a results buffer; the IC further configured to iteratively repeat loading intermediate data bytes corresponding to the first disk block and intermediate data bytes corresponding to the second disk block from at least one of the plurality of SATA storage devices to the arithmetic logic unit; the IC further configured to XOR the intermediate data bytes corresponding to the first disk block and the intermediate data bytes corresponding to the second disk block to generate intermediate results; the IC further configured to generate a RAID syndrome based on, at least in part, the intermediate results.

23. The system according to claim 22, wherein the XOR is a galois field XOR.

24. The system according to claim 23, wherein the IC is further configured to generate a RAID Q syndrome based on, at least in part, the intermediate results.

25. The system according to claim 22, wherein the IC further comprises AND circuitry, the AND circuitry configured to AND a disk byte from a disk block with a plurality of bits of a polynomial to generate a plurality of ANDED results.

26. The system according to claim 25, wherein the plurality of ANDed results are XORed to generate a final result.

27. The system according to claim 26, wherein the final result is used, at least in part, to recover data disk blocks.

* * * * *